(12) United States Patent
Akiyama

(10) Patent No.: US 8,489,126 B2
(45) Date of Patent: Jul. 16, 2013

(54) MOBILE COMMUNICATION SYSTEM AND MOBILE TERMINAL

(71) Applicant: Fujitsu Limited, Kawasaki (JP)

(72) Inventor: Masaki Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/647,455

(22) Filed: Oct. 9, 2012

(65) Prior Publication Data

US 2013/0035119 A1 Feb. 7, 2013

Related U.S. Application Data

(63) Continuation of application No. PCT/JP2011/058849, filed on Apr. 7, 2011.

(30) Foreign Application Priority Data

Apr. 20, 2010 (JP) ................................. 2010-097319

(51) Int. Cl.
*H04W 24/00* (2009.01)

(52) U.S. Cl.
USPC .................. 455/456.6; 455/435.1; 455/432.1; 455/436

(58) Field of Classification Search
USPC ........................ 455/456.6, 432.1, 435.1, 436
See application file for complete search history.

(56) References Cited

U.S. PATENT DOCUMENTS

| | | | |
|---|---|---|---|
| 2010/0085904 | A1 | 4/2010 | Hamaue et al. |
| 2010/0291931 | A1* | 11/2010 | Suemitsu et al. ............. 455/436 |
| 2011/0117937 | A1* | 5/2011 | Meifu et al. ............... 455/456.6 |

FOREIGN PATENT DOCUMENTS

| | | |
|---|---|---|
| JP | 2004-320473 | 11/2004 |
| JP | 2005-303465 | 10/2005 |
| JP | 2007-81714 | 3/2007 |
| JP | 2008-219826 | 9/2008 |
| JP | 2008219826 | * 9/2008 |
| WO | WO 2009/001400 | 12/2008 |
| WO | WO2009001400 | * 12/2008 |
| WO | WO 2009/057544 | 5/2009 |

OTHER PUBLICATIONS

Patent Abstracts of Japan, Publication No. 2008-219826, Published Sep. 18, 2008.
Patent Abstracts of Japan, Publication No. 2005-303465, Published Oct. 27, 2005.
Patent Abstracts of Japan, Publication No. 2007-081714, Published Mar. 29, 2007.

(Continued)

*Primary Examiner* — Manpreet Matharu
(74) *Attorney, Agent, or Firm* — Staas & Halsey LLP

(57) ABSTRACT

A mobile communication system is disclosed. An area information management server sends area information indicating a communicable peripheral area of a location where a mobile terminal exists, and out-of-service information indicating outside of an accessible region, to the mobile terminal. In the mobile terminal, a generating part generates a moving route and moving projection information. A planning part makes a plan for communication execution indicating a communication term in which the mobile terminal communicates with a base station and an interruption term in which the mobile terminal is outside of the accessible region, based on the moving projection information, and the area information and the out-of-service information. A suspension indicating part indicates suspending or restarting the communication of the mobile terminal and a communication partner before and after the interruption term indicated by the plan. A communication part communicates with the base station in accordance with the plan.

10 Claims, 15 Drawing Sheets

OTHER PUBLICATIONS

Patent Abstracts of Japan, Publication No. 2004-320473, Published Nov. 11, 2004.

International Search Report of PCT/JP2011/058849, mailed May 17, 2011.

* cited by examiner

FIG.4

| TIME | COMMUNICATION PLAN |
|---|---|
| 20:55 – 21:00 | CONNECT BY COMMUNICATION METHOD OF REGULAR SERVICE |
| 21:00 – 21:01 | ENTER TUNNEL WHICH IS OUT OF SERVICE AFTER ONE MINUTE AND START COMMUNICATION INTERRUPTION |
| 21:01 – 21:05 | STOP COMMUNICATION IN TUNNEL |
| 21:05 – 21:10 | CONNECT BY COMMUNICATION METHOD OF HIGH SPEED COMMUNICATION SERVICE |
| 21:10 – 21:15 | CONNECT BY COMMUNICATION METHOD OF WIRELESS LAN SERVICE |

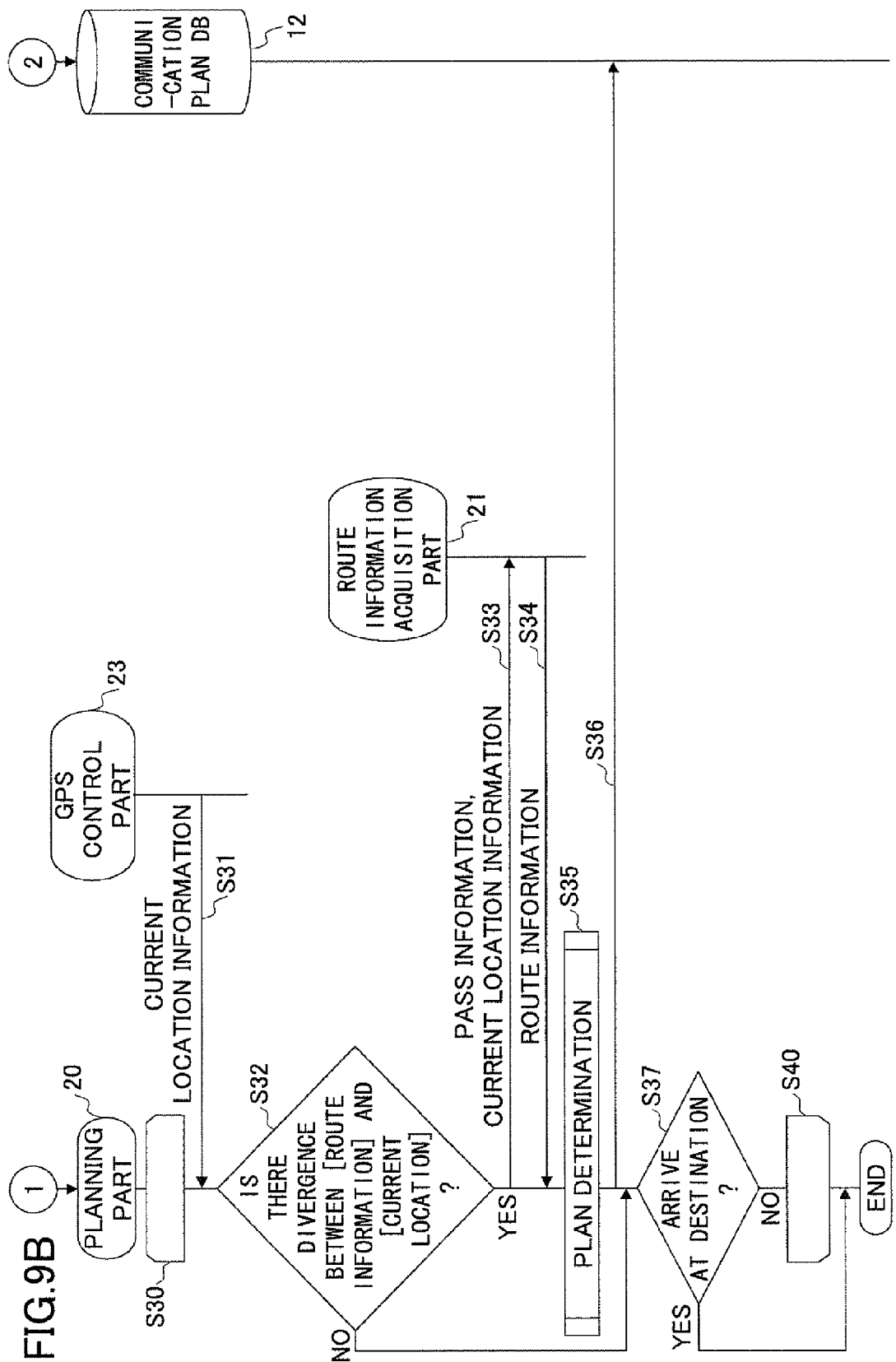

FIG.14

| LOCATION | | NORTH LATITUDE | METHOD | EFFECTIVE SPEED | TIME |
|---|---|---|---|---|---|
| EAST LONGITUDE | | | | | |
| 149.34 | | 40.05 | REGULAR | 0.75Mbps | 2009/05/28 13:00:04 |
| 148.35 | | 38.23 | HIGH SPEED | 2.34Mbps | 2009/05/28 13:30:50 |
| 148.33 | | 38.23 | HIGH SPEED | 1.12Mbps | 2009/05/28 15:20:43 |
| 148.26 | | 39.55 | WIRELESS LAN | 13.24Mbps | 2009/05/28 16:04:23 |

MOBILE COMMUNICATION SYSTEM AND MOBILE TERMINAL

CROSS-REFERENCE TO RELATED APPLICATIONS

This application is a U.S. continuation application filed under 35 USC 111(a) claiming benefit under 35 USC 120 and 365(c) of PCT application PCT/JP2011/058849, filed on Apr. 7, 2011, which claims priority to Japanese Patent Application Ser. No. 2010-097319, filed in Japan on Apr. 20, 2010. The foregoing applications are hereby incorporated herein by reference.

FIELD

The embodiment discussed herein is related to a mobile communication system and a mobile terminal.

BACKGROUND

Recently, various mobile communication services have been widely used, and service areas have been widely provided. In a mobile communication system of a Wideband Code Division Multiple Access (W-CDMA) method, high speed communication services of High Speed Downlink Packet Access (HSDPA) and the like have been widely applied as well as a service of a regular communication speed (called "regular service"). Also, a wireless Local Area Network (LAN), which realizes data communication with further high speed, is widely used. The wireless LAN service is regarded as a service of a public area, and service areas are scattered.

A mobile terminal supporting multiple communication services has mounted communication modules of respective communication methods for the communication services. In addition, in the above-described communication services, communication speed becomes higher with greater power consumption in a sequence of the regular service, the high speed communication service, and the wireless LAN service. Thus, the service area becomes smaller.

In the mobile terminal supporting the multiple communication services, a communication module supporting the multiple communication services searches for radio waves and determines whether communication is possible. It should be noted that in a case of being outside of communication range, since a random access outputting radio waves method in all directions is performed within a short period, the power consumption becomes greater.

In order to continue the communication in a case in which the communication is disabled while communicating with a base station, there is a "handover" method which changes a communication destination to another base station of the same communication method as the previous communication method before disabling of the communication and another "handover" which changes the communication destination to a base station of a different communication method from that used before disabling of the communication. In the "handover" methods, a communicable state with the communication destination may be always maintained to immediately switch the base station. As a result, the power consumption becomes greater. Also, in the latter "handover" method, communication disconnection may occur. Conventionally, the latter "handover" method is not conducted.

In a case in which the mobile terminal is located outside of the communication range, since the mobile terminal fails the handover while communicating with a server, after that, even if the mobile terminal comes back to the communication range, mostly the mobile terminal does not continue the communication at a service level. Even in a case in which the communication is possible to be continued, it may take time to resume the service. The mobile terminal takes time to detect being outside of the communication range due to weak radio waves. Since the server does not know a reason why it becomes impossible for the mobile terminal to communicate with the server, the server does not detect the communication disconnection until a time out.

In a known technology, a current location, a destination, a departure time, and an arrival time of a train are acquired from an IC tag of a communication terminal device at a train, and are transmitted to a base station apparatus. The base station apparatus estimates time when a user will exist in the service area, based on a distance from a current location to a service area boundary. Thus, it is possible to determine with high accuracy the service which a user is likely to select and successively receives until an end of the service.

In another technology, in a mobile terminal capable of communicating with both a first wireless communication system of a cellular method which covers a wide area and a second wireless communication system of a general hot spot method, detailed area location information of the second wireless communication system acquired from a base station is stored, and power wasted on area detection is prevented. Moreover, when communication speed of the mobile terminal is less than a threshold, communication with the first wireless communication system is maintained.

PATENT DOCUMENTS

Japanese Laid-open Patent Publication No. 2007-81714
Japanese Laid-open Patent Publication No. 2004-320473

SUMMARY

According to one aspect of the embodiment, there is provided a mobile communication system, including: an area information management server; and a mobile terminal, wherein the area information management server is configured to send area information indicating a communicable peripheral area of a location where the mobile terminal exists, and out-of-service information indicating outside of an accessible region, to the mobile terminal; and the mobile terminal includes a generating part configured to generate a moving route and moving projection information of the mobile terminal; a planning part configured to make a plan for communication execution indicating a communication term in which the mobile terminal communicates with a base station and an interruption term which includes a term when the mobile terminal is outside of the accessible region, based on the moving projection information, and the area information and the out-of-service information which are received from the area information management server; a suspension indicating part configured to indicate suspending or restarting the communication of the mobile terminal itself and a communication partner before and after the interruption term indicated by the plan for the communication execution; and a communication part configured to communicate with the base station in accordance with the plan for the communication execution.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 4 is a diagram illustrating an example of a plan of communication execution;

FIG. 9A and FIG. 9B are diagrams illustrating an example of a sequence of a planning process for communication execution;

FIG. 14 is a diagram illustrating an example of communication history information.

DESCRIPTION OF EMBODIMENTS

In the following, embodiments of the present invention will be described with reference to the accompanying drawings.
<Configuration of Mobile Terminal>

Figure 1:
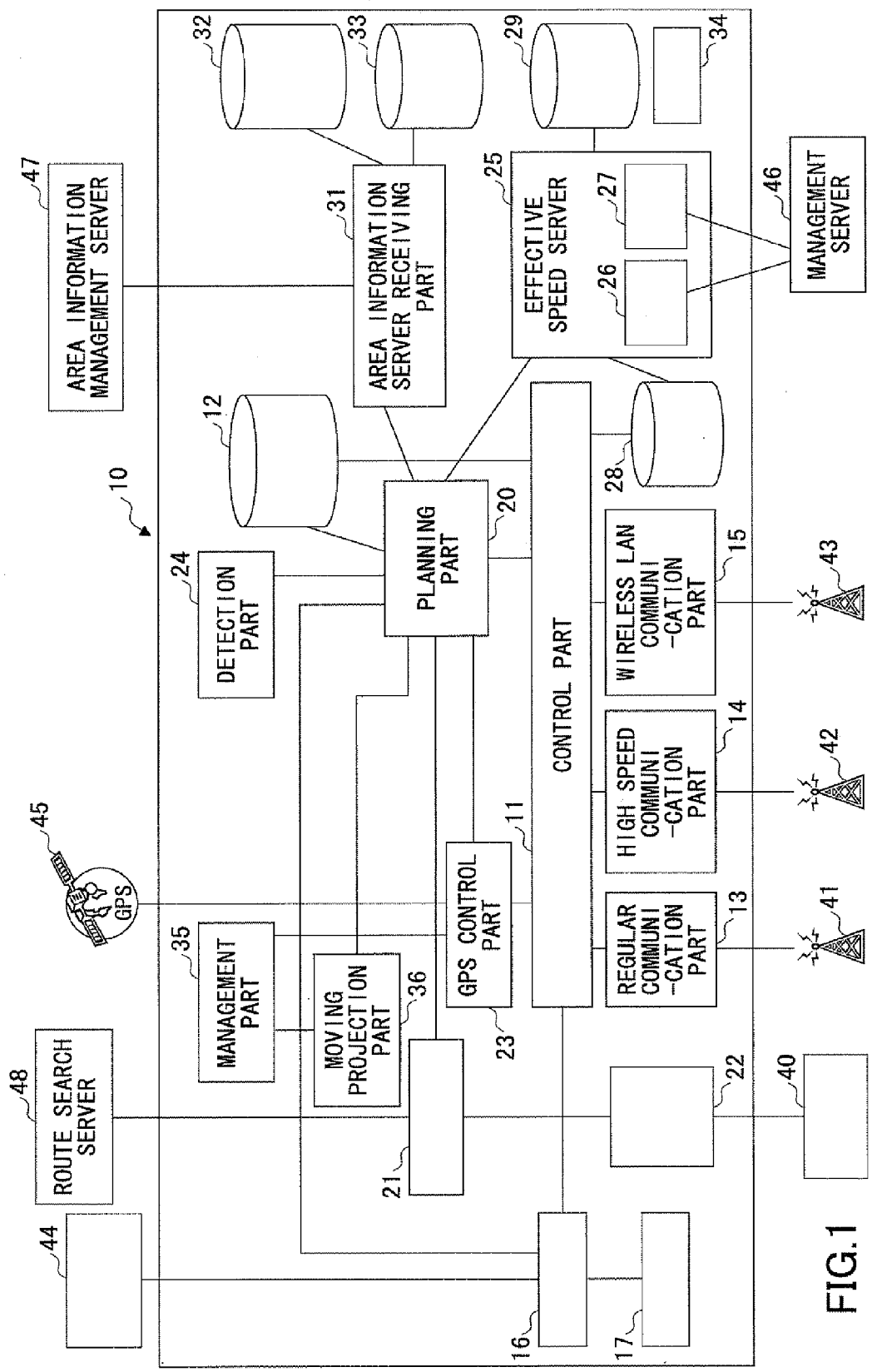
FIG. 1 is a diagram illustrating a configuration of an embodiment of a mobile terminal in a mobile communication system.

FIG. 1 is a diagram illustrating a configuration of an embodiment of a mobile terminal in a mobile communication system. In FIG. 1, a control part 11 in a mobile terminal 10 performs communication by switching a regular communication part 13, a high speed communication part 14, and a wireless LAN communication part 15 in accordance with a communication execution plan (hereinafter, may be called "plan") stored in a communication plan DataBase (DB) 12.

The regular communication part 13 performs wireless communication with a base station 41 of a regular service of a Wideband Code Division Multiple Access (W-CDMA) method. The high speed communication part 14 performs wireless communication with a base station 42 of a high speed communication service of High Speed Downlink Packet Access (HSDPA) and the like of the Wideband Code Division Multiple Access (W-CDMA) method. The wireless LAN communication part 15 performs wireless communication with a base station 43 of a wireless LAN service. Also, the control part 11 for switching a communication method sends notices of a "communication stop" due to being outside of radio wave reception, that is, outside of an accessible region, and of a "communication restart" after the "communication stop", to an application communication control part 16 beforehand. In this specification, an "application" may be also called an "APP".

The application communication control part 16 performs communication with an application server 44 in accordance with a request of a communication application 17, which request is created by a user. When the application communication control part 16 receives the notice of the "communication stop" from the control part 11 for switching the communication method, the application communication control part 16 sends the notice to the application server 44 before the communication actually stops. The application server 44 sets the communication to be in a suspending state and prepares for the "communication stop". Furthermore, the application communication control part 16 also sends a notice of the suspending state to the communication application 17 to transition to a communication suspending state even at an application level.

When the application communication control part 16 receives the notice of the "communication restart" from the control part 11 for switching the communication method, the application communication control part 16 sends the notice of the "communication restart" to the application server 44 to set the communication to be in the restart state. Also, the application communication control part 16 sends the notice of the "communication restart" to the communication application 17 to restart the communication even at the application level. In addition, the application communication control part 16 determines line speed for the communication application 17, and supplies the determined line speed to a planning part 20 for planning a communication execution. The communication application 17 communicates with the application server 44 on an application layer.

Each of the regular communication part 13, the high speed communication part 14, and the wireless LAN communication part 15 conducts a process of a physical layer. The application communication control part 16 conducts a process of a network layer. The communication application 17 conducts a process of an application layer. When the mobile terminal 10 is outside of the communication range such as in a tunnel, communications are disconnected between the communication parts 13, 14, and 15, and the base stations 41, 42, and 43. Each of the communication application 17 of the application layer and the application server 44 retains a data sending/receiving process prior to disconnection of the communication. When the mobile terminal 10 exits from the tunnel, any one of the regular communication part 13, the high speed communication part 14, and the wireless LAN communication part 15 starts the communication with respective base station 41, 42, or 43. After that, each of the communication application 17 and the application server 44 restarts the data sending/receiving process being retained.

In this case, each of the communication application 17 and the application server 44 knows for which data the data sending/receiving process has been completed or which data are retained. It is possible to immediately restart the data sending/receiving process. Moreover, the communication method when the data sending/receiving process is restarted may be different from the communication method prior to retaining the data sending/receiving process. It is possible to select an optimum communication method when the data sending/receiving process is restarted.

In a case in which the mobile terminal 10 moves outside of the communication range and the communication is conventionally disconnected, the communication application 17 of the application layer and the application server 44 do not recognize each other until each of them completes sending and receiving the retained data. After the mobile terminal 10 comes back into the communication range and the communication is restarted, time is consumed to ensure from which location data are to be sent or received.

A route information acquisition part 21 performs communication at the application layer with a route search server 48. The route search server 48 is regarded as existing service which searches for and reports transfer of a train when a getting-on station name and a getting-off station name are indicated. The route information acquisition part 21 matches route information of a train pass with train time table information. The route information is acquired from an automatic ticket gate 40 when passing the automatic ticket gate 40 at a station, and is sent to the route information acquisition part 21 through a pass information acquisition part 22. The train time table information is acquired by searching in the route search server 48 by using the route information. Then, the route information acquisition part 21 creates a movement route and destination route information indicating passing time and the like as moving projection information. The destination route information is sent to the planning part 20 for planning the communication execution.

Moreover, the route information acquisition part 21 re-creates the destination route information when the planning part 20 requests re-acquiring the destination route information, that is, when there is a difference between the destination route information being created and current location information acquired by a GPS (Global Positioning System) control part 23.

The pass information acquisition part 22 acquires the route information of the train pass through the automatic ticket gate 40 when a user of the train pass passes a ticket gate to get on a train, and supplies the route information to the route information acquisition part 21.

The GPS control part 23 periodically acquires location information from a Global Positioning System (GPS) 45 and supplies the location information to the control part 11, the planning part 20, and a management part 35 for a movement history. The control part 11 for switching the communication method utilizes the supplied location information to create the communication history. The planning part 20 for the communication execution utilizes the supplied location information to create a plan for the communication execution.

The management part 35 manages past location information as the movement history. A moving projection part 36 utilizes the movement history to estimate a movement direction and movement speed of the mobile terminal 10, and creates the movement route and information indicating passing time and the like as the moving projection information of the mobile terminal 10 itself. The moving projection information is supplied to the planning part 20 for the communication execution.

A detection part 24 checks a residual capacity of a battery of the mobile terminal 10, and sends a notice to the planning part 20 for planning the communication execution when the residual capacity becomes lower than a threshold.

An effective speed server 25 communicates with a management server 46 for effective speed information at the application layer. A sending part 26 of the effective speed server 25 sends communication history information stored in a communication history DB 28 to the management server 46 for the effective speed information at a constant period. The communication history DB 28 stores the communication history information formed by time information, the location information, and the effective speed information.

The effective speed server 25 sends a query including the location information of the mobile terminal 10 itself which is received from the GPS control part 23, from the sending part 26 to the management server 46 for the effective speed information, and receives the effective speed information of a peripheral area of a location where the mobile terminal 10 itself exists, from the management server 46 by a receiving part 27.

Figure 2:
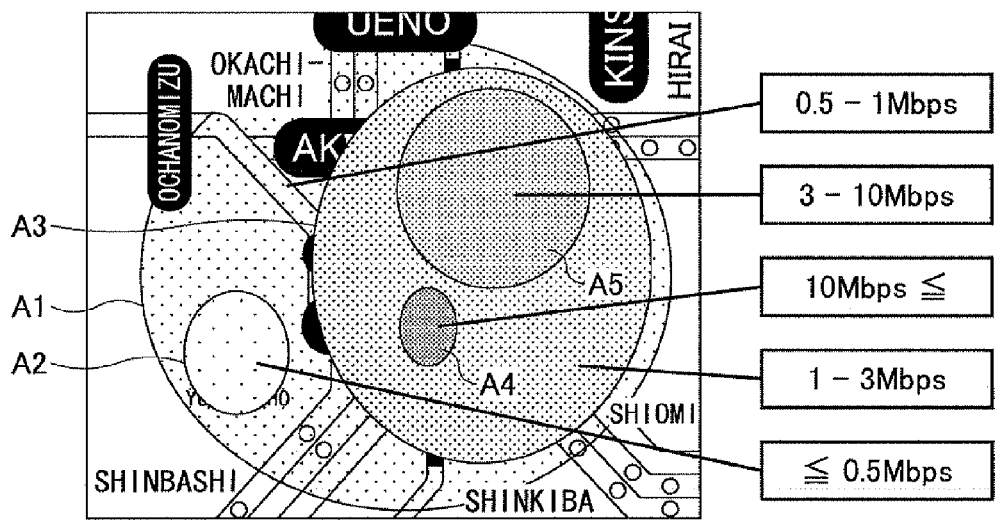
FIG. 2 is a diagram illustrating an example of effective speed information.

FIG. 2 illustrates an example of the effective speed information. In FIG. 2, effective speed is 0.5 to 1 Mbps in an area circled by a solid line A1. The effective speed is less than or equal to 0.5 Mbps in an area circled by a solid line A2. The effective speed is 1 to 3 Mbps in an area circled by a solid line A3. The effective speed is greater than or equal to 10 Mbps in an area circled by a solid line A4. The effective speed is 3 to 10 Mbps in an area circled by a solid line A5.

The effective speed information received from the management server 46 is stored in an effective speed information DB 29. There is a theoretical maximum communication speed for each communication method. However, an actual communication speed varies depending on the number of users and a radio wave state when the mobile terminal 10 is used. Thus, information indicating the actual communication speed is called "effective speed information".

An area information server receiving part 31 performs communication with an area information management server 47 at the application layer. The area information server receiving part 31 sends a request including the location information of the mobile terminal 10 received from the GPS control part 23 to the area information management server 47. The area information server receiving part 31 receives area information for each communication method and radio wave out-of-service information for each communication method of the peripheral area of a location where the mobile terminal 10 exists, and stores the area information and the radio wave out-of-service information to an area information DB 32 for storing the area information for each communication method and an out-of-service information DB 33 for storing radio wave out-of-service information for each communication method.

The area information for each communication method indicates a communicable area for each method. The radio wave out-of-service information for each communication method indicates an area which becomes outside of the radio waves, that is, outside of the accessible region, due to a shielding object such as the tunnel, a building, or the like. Since locations of the tunnel and the building are not moved, places being outside of the radio waves are determined beforehand. Thus, areas being outside of the radio waves are known.

Figure 3:
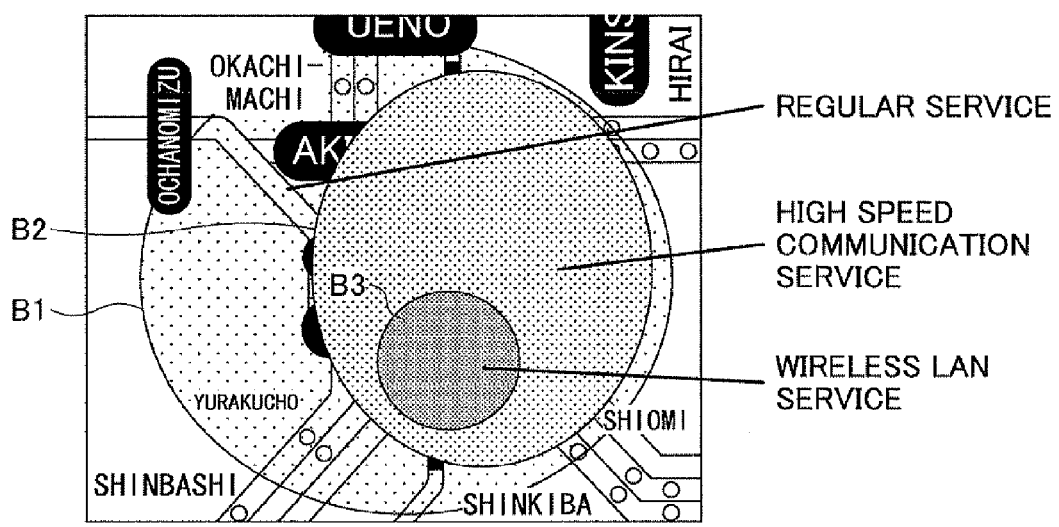
FIG. 3 is a diagram illustrating an example of area information for each communication method.

FIG. 3 illustrates an example of the area information for each communication method. In FIG. 3, an area circled by a solid line B1 is regarded as an area of the regular service, an area circled by a solid line B2 is regarded as an area of the high speed communication service, and an area circled by a solid line B3 is regarded as an area of the wireless LAN service.

The planning part 20 makes a plan of the communication execution during moving based on the destination route information (or a moving direction and a moving speed being estimated) acquired by the route information acquisition part 21, the area information for each communication method, the radio wave out-of-service information for each communication method, and the effective speed information. The planning part 20 stores the plan of the communication execution in the communication plan DB 12. The plan of the communication execution is regarded as information formed by items (1) and (2) described below. Offsets by the items (3) through (5), which are described below, may be additionally provided, depending on a situation, in the plan of the communication execution.

FIG. 4 illustrates an example of the plan of the communication execution. In FIG. 4, the communication method of the regular service is used for a connection at time from 20:55 to 21:00. A communication interruption process begins at time between 21:00 and 21:01 since the mobile terminal 10 enters the tunnel and the communication becomes out of service after one minute. At time between 21:05 to 21:10, the connection is conducted with the communication method of the high speed communication service. At time between 21:10 and 21:15, the connection is conducted with the communication method of the wireless LAN service. The above description corresponds to information of the plan of the communication execution.

(1) The planning part 20 selects communication methods based on the area information for each communication method and the effective speed information, so that the communication is conducted with the highest speed during moving.

(2) The communication is interrupted based on the radio waves out-of-service information for each communication method not to suddenly disconnect the communication before the radio waves become out of service.

(3) The current location information is periodically acquired from the GPS control part 23. When there is a difference between the current location information and a plan of the destination route information, the destination route information is re-acquired, and the communication execution is re-planned based on the re-acquired destination route information.

(4) When the detection part 24 detects that the battery capacity comes to the end, the communication execution is re-planned not to select the communication method which consumes great power.

(5) Information indicating communication speed for the communication application 17 is acquired from the application communication control part 16, and the planning part 20 re-plans the communication execution not to unnecessarily select a high speed line which exceeds the communication speed for the communication application 17.

A mobile telephone part 34 (FIG. 1) is connected to one of the regular communication part 13, the high speed communication part 14, and the wireless LAN communication part 15 by a control of the control part 11 for switching the communication method, and conducts a voice communication with the respective base station 41, 42, or 43.

Figure 5:
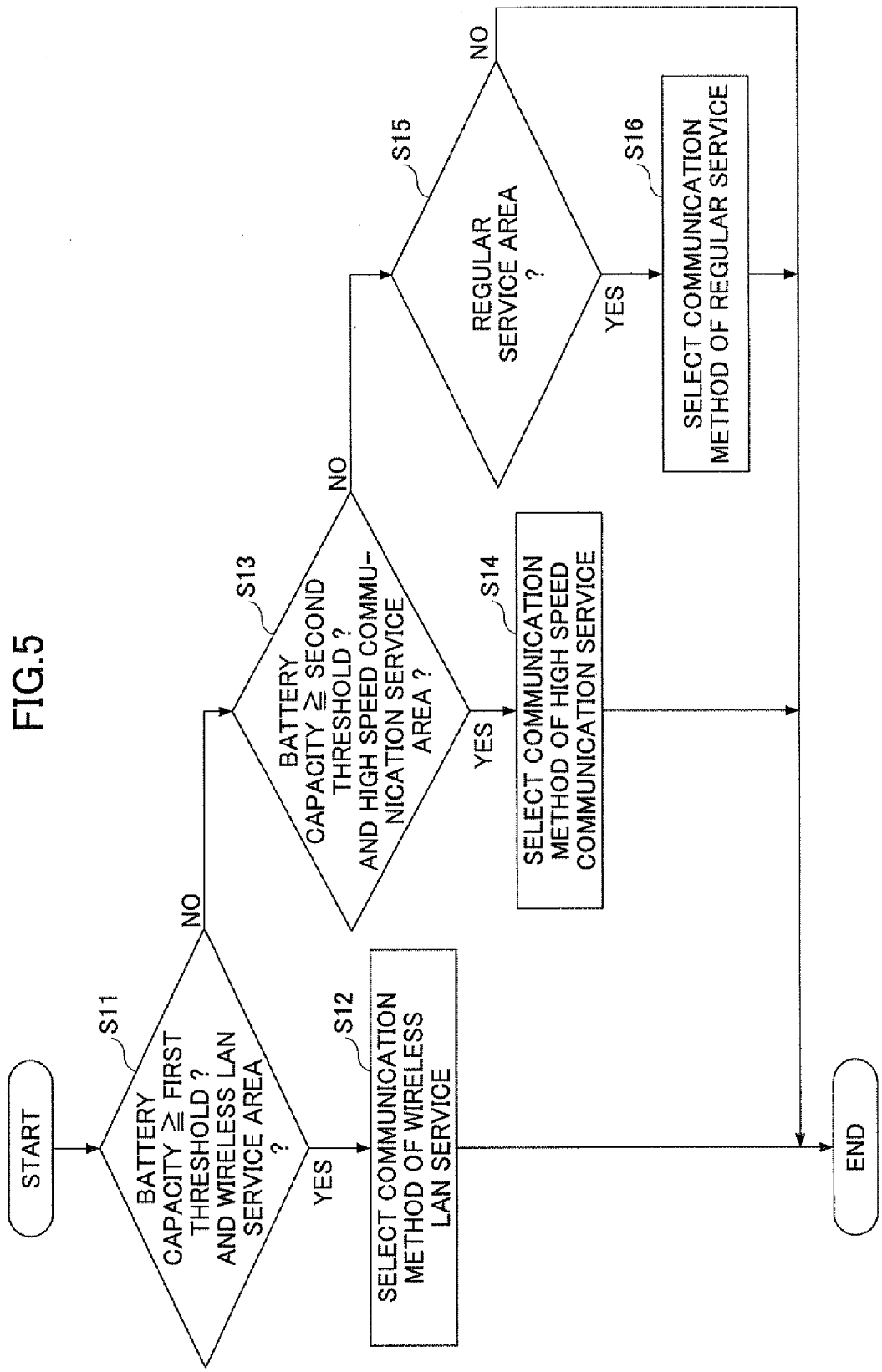
FIG. 5 is flowchart for explaining an example of a process for selecting a communication method.

FIG. 5 is flowchart for explaining an example of a process for the planning part 20 to select the communication method depending on the battery capacity which the detection part 24 detects. In FIG. 5, in step S11, the planning part 20 determines whether the battery capacity is greater than or equal to a first threshold (which may be 50% or the like) and a current area is the area of the wireless LAN service. When this condition is satisfied, the communication method of the wireless LAN service is selected in step S12.

On the other hand, the condition of the step S11 is not satisfied, the planning part 20 for planning the communication execution determines, in step S13, whether the battery capacity is greater than or equal to a second threshold (may be 20% or the like) and the current area is the area of the high speed communication service. When this condition of the step S13 is satisfied, the planning part 20 selects the communication method of the high speed service in step S14.

When the condition of the step S13 is not satisfied, the planning part 20 determines whether the current area is the area of regular service in step S15. When this condition is satisfied, the planning part 20 selects the communication method of the regular service in step S16. When the condition of the step S15 is not satisfied, the planning part 20 terminates this process.

<Configuration of Application Server>

Figure 6:
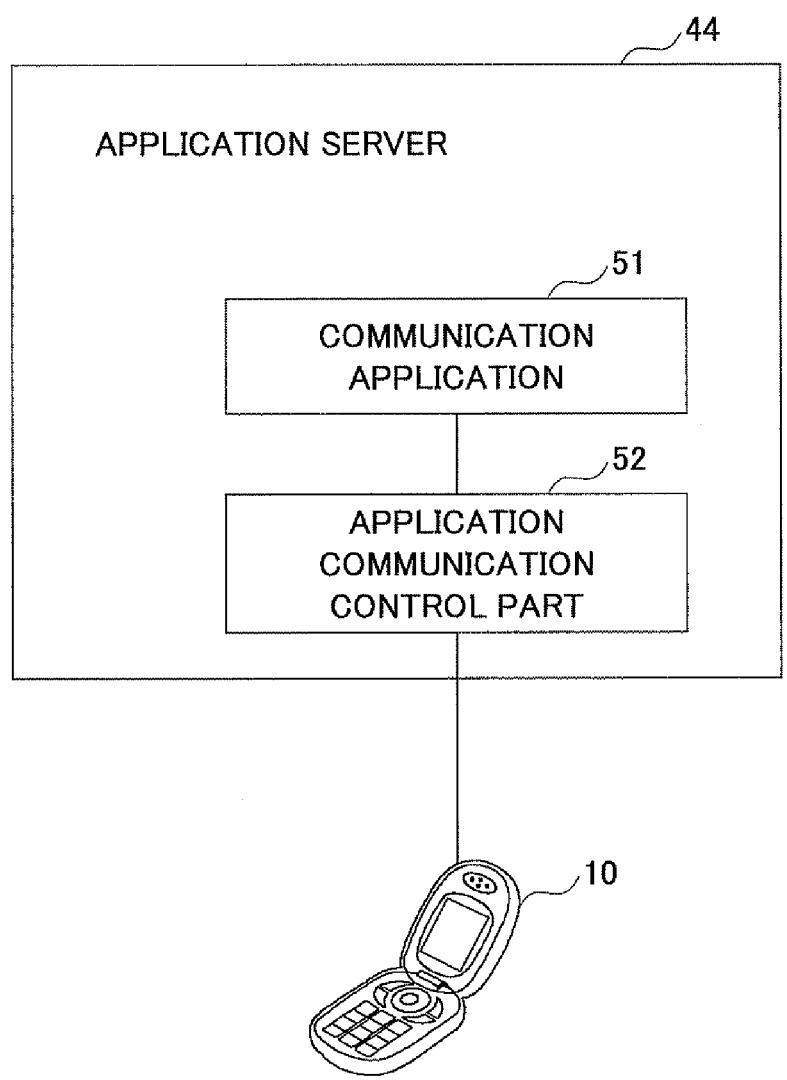
FIG. 6 is a diagram illustrating an example of an application server.

FIG. 6 is a diagram illustrating an example of a configuration of the application server 44. In FIG. 6, the application server 44 includes a communication application 51 and an application communication control part 52. The application communication control part 52 conducts the following process when communicating with the application communication control part 16 of the mobile terminal 10. The application communication control part 52 prepares for the communication stop by setting the communication to be in the suspending state when the notice of the communication stop is supplied from the application communication control part 16 of the mobile terminal 10. Also, the notice of the communication stop is sent to the communication application 51, to transition to the suspending state at the application level.

Moreover, when the notice of the communication restart is received from the application communication control part 16 of the mobile terminal 10, the application communication control part 52 sets the communication to be in the restart state. Also, the notice of the communication restart is sent to the communication application 51 to restart the communication at the application level. By the above processes, it is possible to make time shorter when the communication is not available due to being outside of the radio waves.

<Configuration of Area Information Management Server for Each Communication Method>

Figure 7:
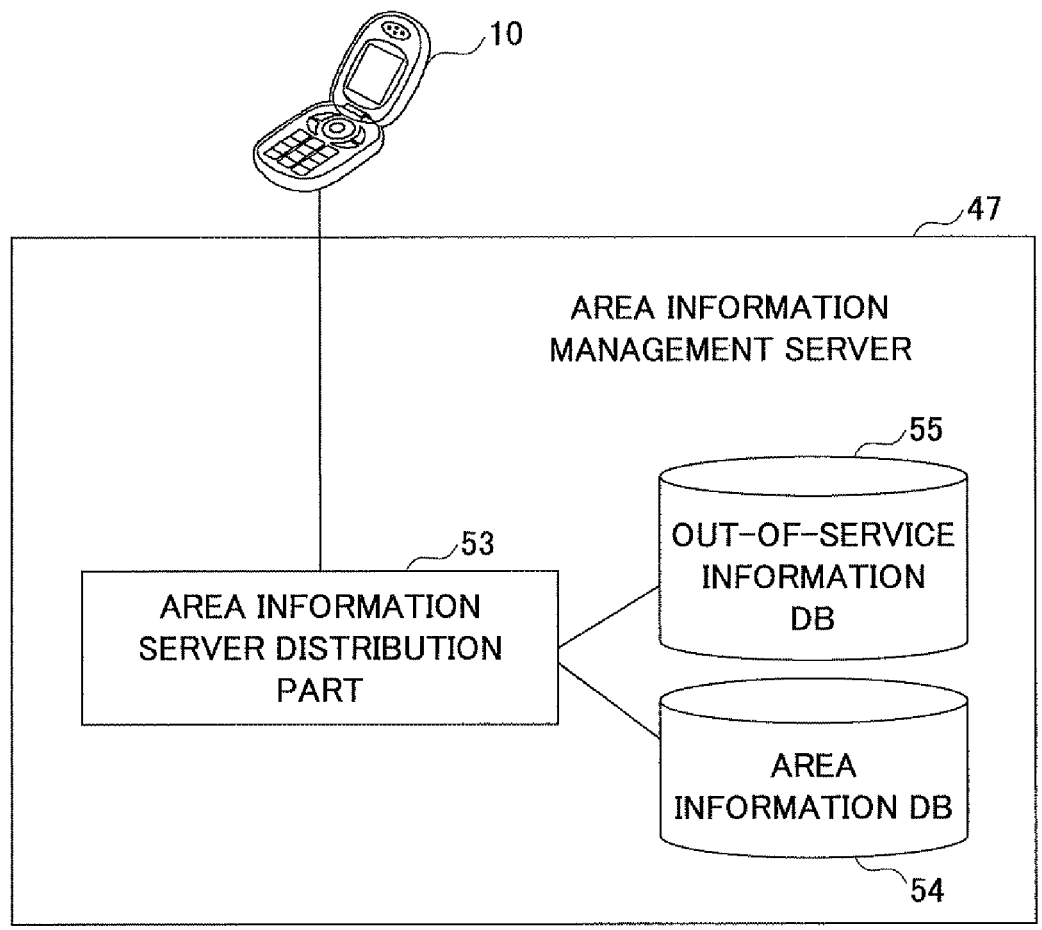
FIG. 7 is a diagram illustrating an example of a configuration of an area information management server for managing area information for each communication method.

FIG. 7 is a diagram illustrating an example of a configuration of the area information management server 47. In FIG. 7, the area information management server 47 for managing the area information for each communication method includes an area information server distribution part 53, an area information DB 54 for managing the area information for each communication method, and an out-of-service information DB 55 for managing the out-of-service area concerning the radio waves for each communication method.

The area information for each communication method is stored beforehand in the area information DB 54. The area information indicates areas where each communication method is available. The out-of-service information for each communication method is stored beforehand in the out-of-service information DB 55. The out-of-service information indicates areas where the radio waves become out of service due to the shielding object such as the tunnel, the building, or the like. The area information server distribution part 53 sends the mobile terminal 10 being an request originator, the area information for each communication method concerning the peripheral area of a location where the mobile terminal 10 exists and the out-of-service information concerning the radio waves for each communication method in response to a request of the mobile terminal 10.

<Configuration of Effective Speed Information Management Server>

Figure 8:
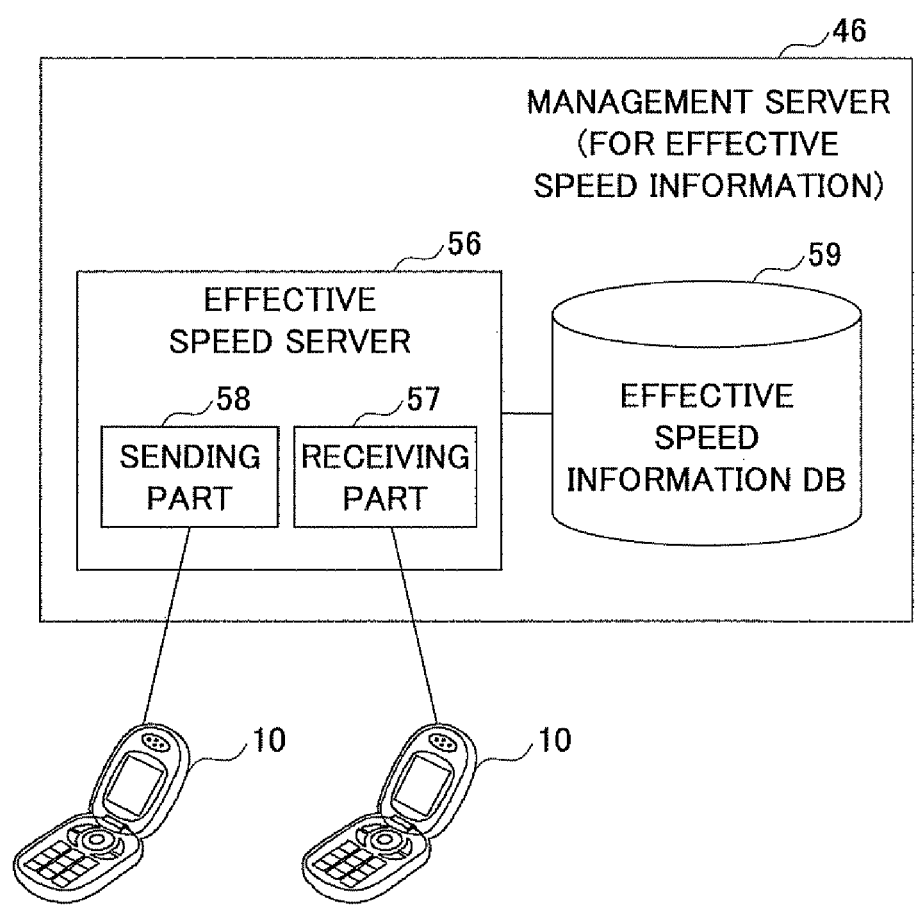
FIG. 8 is a diagram illustrating an example of a configuration of a management server for managing effective speed information.

FIG. 8 is a diagram illustrating an example of a configuration of the management server 46 for effective speed information. In FIG. 8, the management server 46 includes an effective speed server 56 and an effective speed information DB 59. The effective speed server 56 aggregates communication history received from each of the mobile terminals 10 by a receiving part 57, that is, time, the location information, and the effective speed, creates the effective speed information for each area and each communication method, and stores the effective speed information to the effective speed information DB 59 for each area and each communication method. The effective speed server 56 reads out the effective speed information of a peripheral area of a location where the mobile terminal 10 exists, in response to a request from the mobile terminal 10, and sends the effective speed information of the peripheral area to the mobile terminal 10 being a request originator.

<Sequence of Planning Process for Communication Execution>

Figure 9A:
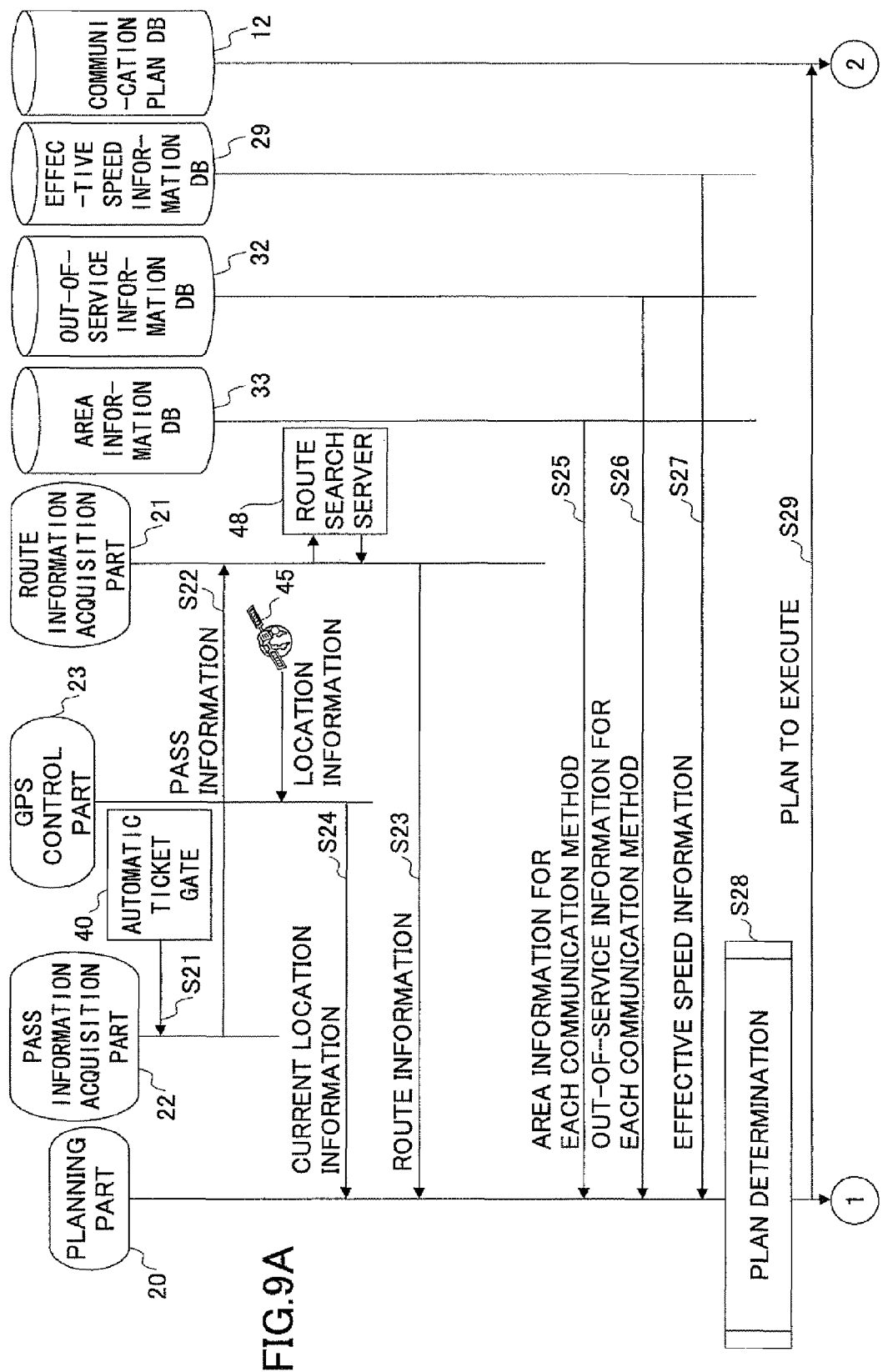

FIG. 9A and FIG. 9B are diagrams illustrating an example of a sequence of the planning process for the communication execution. In FIG. 9A, when passing automatic ticket gate 40 at a station, the pass information acquisition part 22 reads out the route information and sends the route information to the route information acquisition part 21 (steps S21 and S22). The route information acquisition part 21 matches the route information of the train pass with the train time table information acquired by searching in the route search server 48, creates the destination route information including information of the moving route and time, and sends the destination route information to the planning part 20 (step S23).

Figure 10:
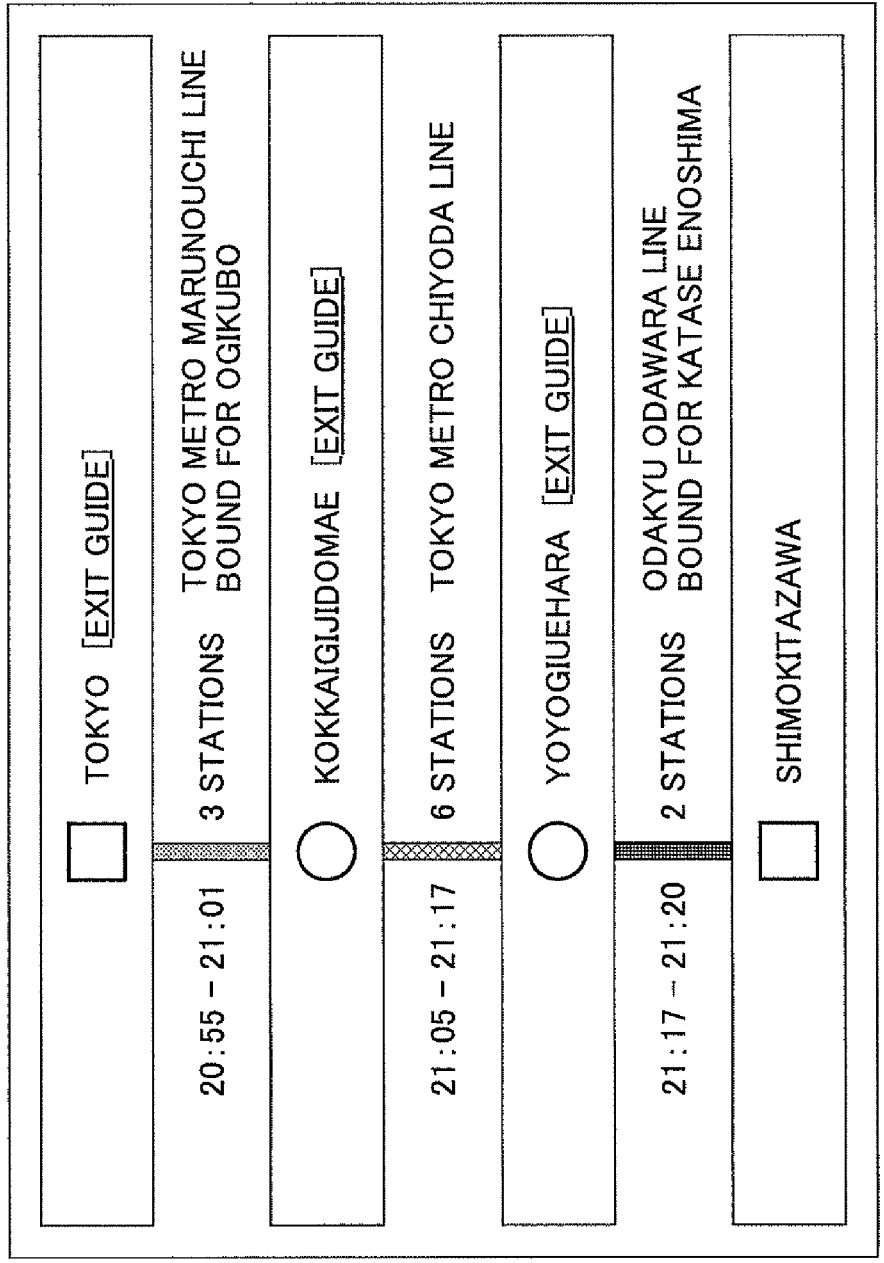
FIG. 10 is a diagram illustrating an example of destination route information.

FIG. 10 is a diagram illustrating an example of the destination route information. In FIG. 10, the mobile terminal 10 moves from Tokyo station to Kokkai-gijido-mae station by a subway from time at 20:55 to time at 21:01. The mobile terminal 10 moves from Kokkai-gijido-mae station to Yoyogi-uehara station by a subway from time 21:05 to time 21:17. The mobile terminal 10 further moves from Yoyogi-uehara station to Shimo-kitazawa station from time at 21:17 to time at 21:20.

The GPS control part 23 sends the current location information acquired from the GPS 45 to the planning part 20 (step S24). In addition, the area information for each communication method, out-of-service information of the radio waves for each communication method, and the effective speed information are read out respectively from the area information 33, the out-of-service information DB 32, and the effective speed information DB 29, and are supplied to the planning part 20 (steps S25, S26, and S27).

The planning part 20 for the communication execution makes a plan of the communication execution during moving based on the current location information, the destination route information, the area information for each communication method, the out-of-service information of the radio waves for each communication method, and the effective speed information, and stores the plan in the communication plan DB 12 (steps S28 and S29).

A loop process is performed in next steps S30 through S40 in FIG. 9B. The GPS control part 23 sends the current location information acquired from the GPS 45 to the planning part 20 for the communication execution (step S31). The planning part 20 determines whether there is a difference between the route information and the current location information (step S32). When there is the difference, the planning part 20 sends the route information of the train pass and the current location information to the route information acquisition part 21 (step S33), and receives new destination route information from the route information acquisition part 21 (step S34). On the other hand, when there is no difference between the route information and the current location information, the planning part 20 advances to step S37.

The planning part 20 makes a new plan for the communication execution based on the current location information, the destination route information, the area information for each communication method, the out-of-service information of the radio waves for each communication method, and the effective speed information, and stores the new plan in the communication plan DB 12 (steps S35 and S36). After that, the planning part 20 determines whether the mobile terminal 10 arrives at a destination (step S37). When the mobile terminal 10 arrives at the destination, the planning part 20 terminates this process.

<Sequence of Communication Execution Process>

Figure 11:
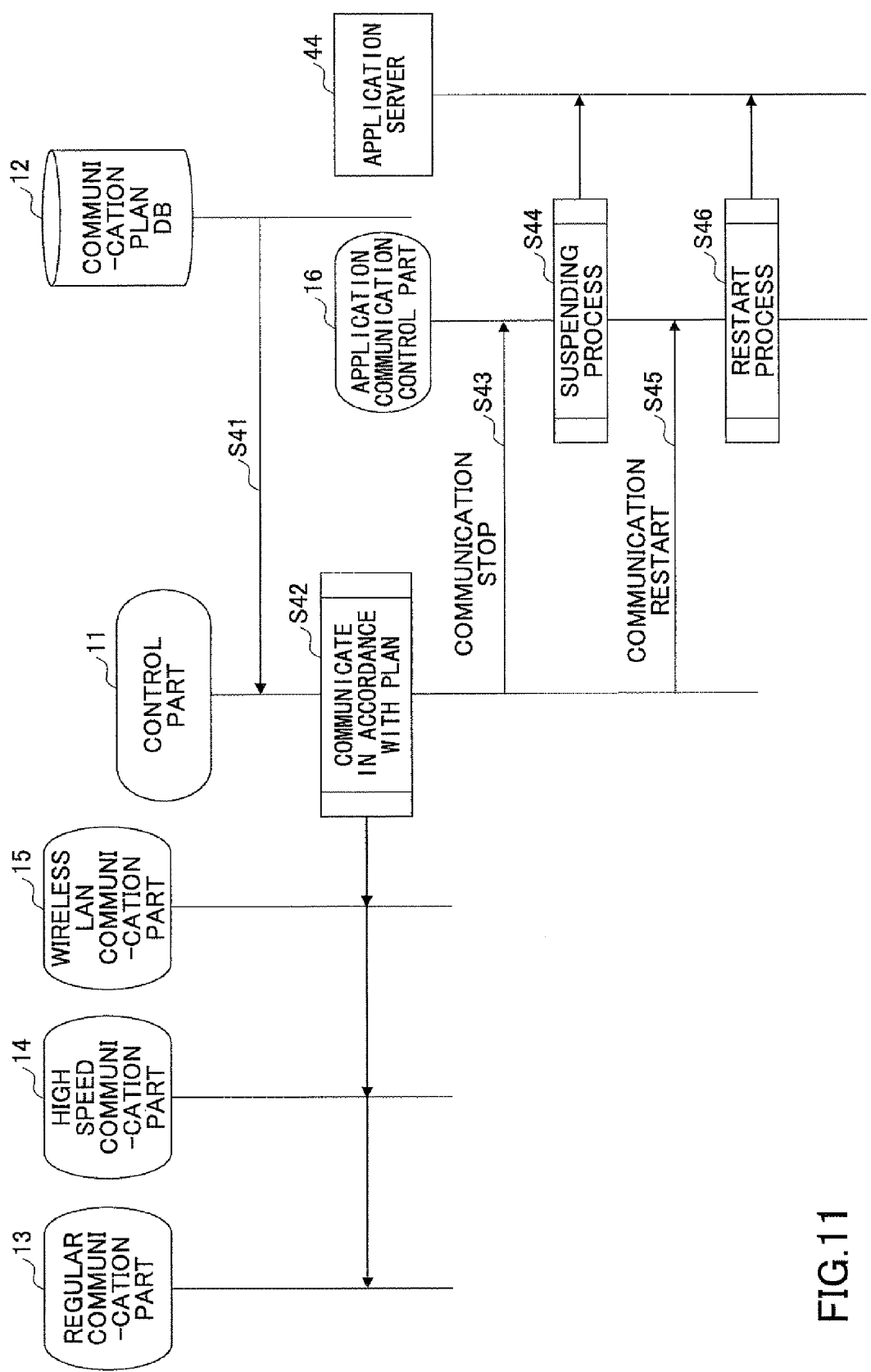
FIG. 11 is a diagram illustrating an example of a sequence of a communication execution process.

FIG. 11 is a diagram illustrating an example of a communication execution process. In FIG. 11, the control part 11 for switching the communication method reads out the plan of the communication execution from the communication plan DB 12 (step S41), and conducts the communication by switching one of the regular communication part 13, the high speed communication part 14, and the wireless LAN communication part 15 in accordance with the plan of the communication execution (step S42). Furthermore, when the communication stop is indicated by the plan of the communication execution, the control part 11 for switching the communication method indicates to the application communication control part 16 to stop the communication (step S43). By this process, the application communication control part 16 executes a suspending process (in other words, the communication interruption process), and instructs the application server 44 to stop the communication (step S44).

Moreover, when the communication restart is indicated by the plan of the communication execution, the control part 11 for switching the communication method instructs the application communication control part 16 to restart the communication (step S45). By this process, the application communication control part 16 executes a restart process (in other words, a communication restart process), and instructs the application server 44 to restart the communication (step S46).

<Process Sequence of Area Information Server Receiving Part for Each Communication Method>

Figure 12:
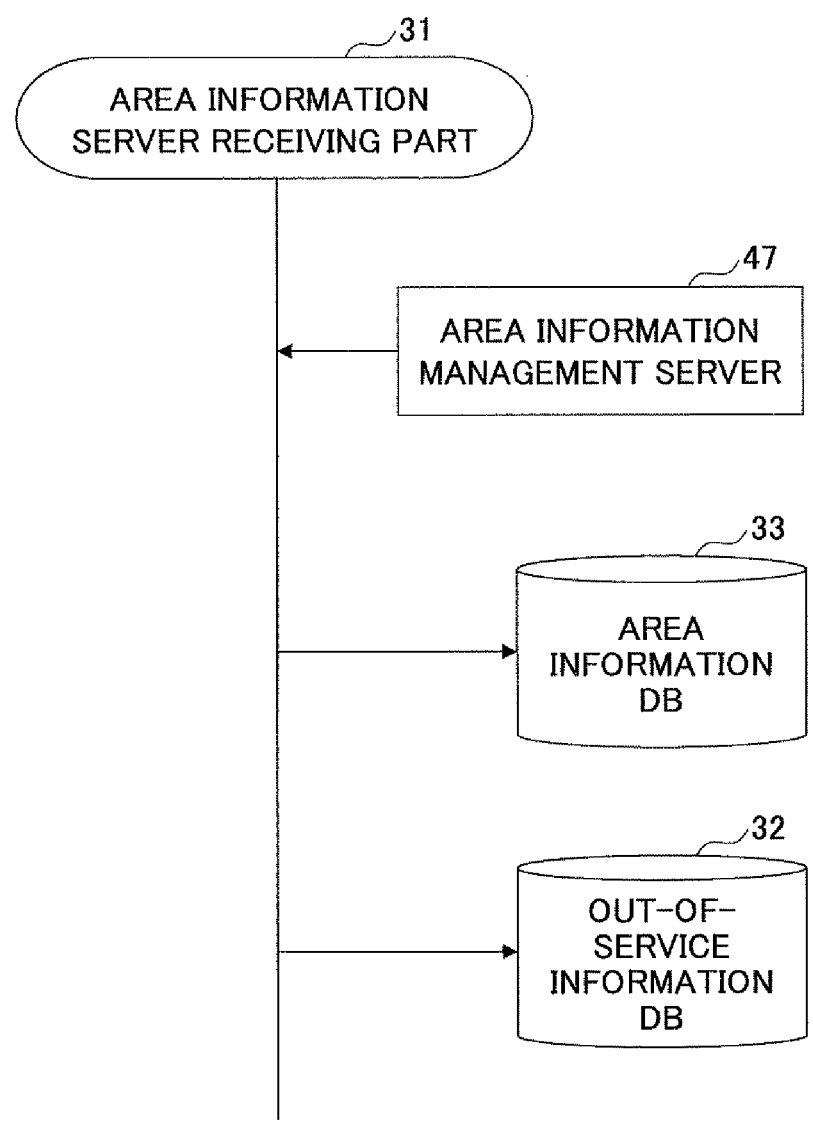
FIG. 12 is a diagram illustrating an example of a sequence of a process executed by an area information server receiving part.

FIG. 12 is a diagram illustrating an example of a sequence of a process executed by the area information server receiving part 31. The area information server receiving part 31 receives the area information for each communication method and the out-of-service information of the radio waves for each communication method from the area information management server 47, and stores the area information and the out-of-service information in the area information DB 33 and the out-of-service information DB 32, respectively.

<Process Sequence of Sending Part of Management Server for Effective Speed Information>

Figure 13:
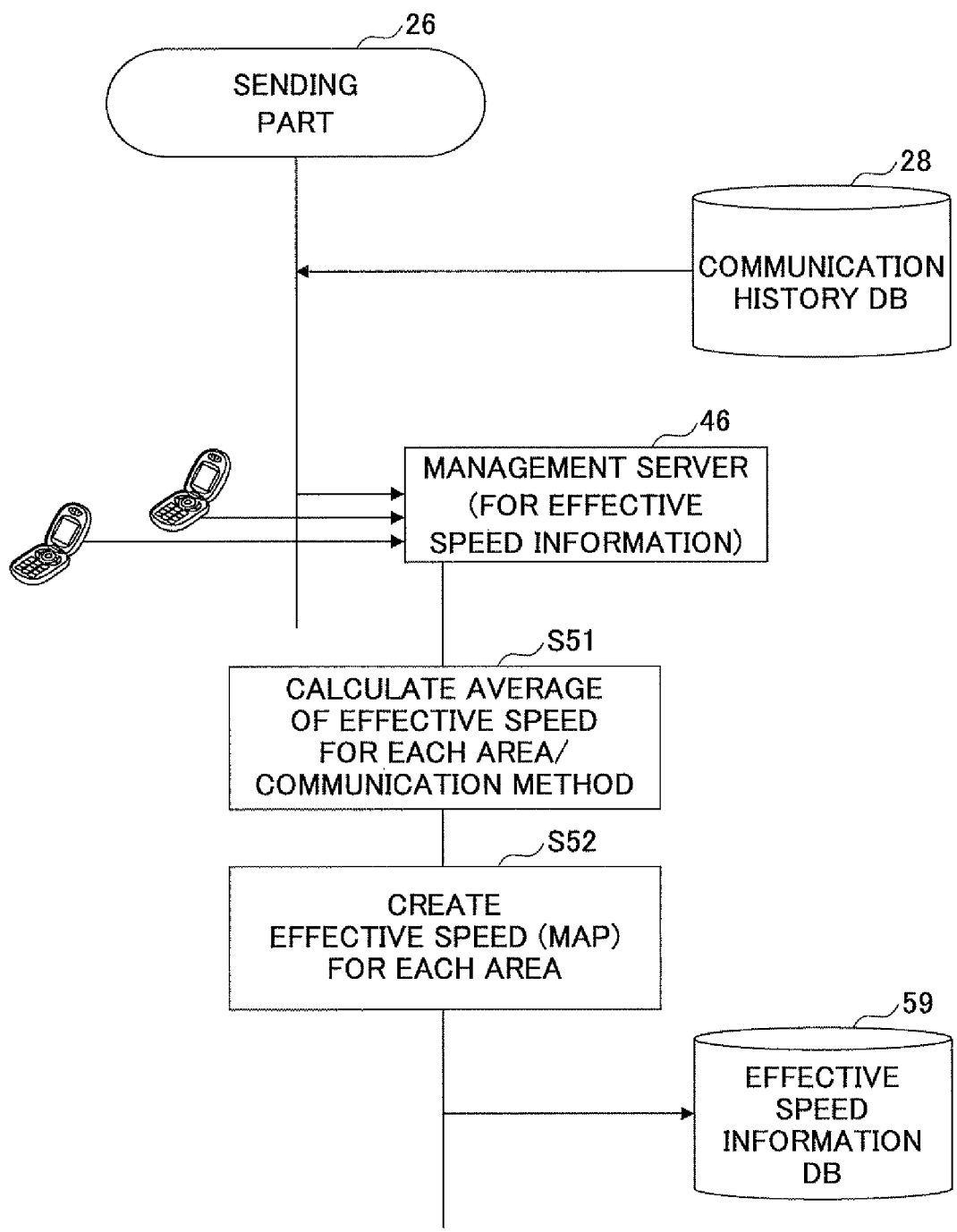
FIG. 13 is a diagram illustrating an example of a sequence of a process executed by a management server for the effective speed information.

FIG. 13 is a diagram illustrating an example of a sequence of a process executed by the management server 46 for the effective speed information. The sending part 26 of the effective speed server 25 sends the communication history information stored in the communication history DB 28 to the management server 46 for the effective speed information at the constant period. An example of the communication history information is illustrated in FIG. 14. In FIG. 14, the communication history information includes information of a communication location (latitude and longitude), a communication method, the effective speed, a communication time, and the like.

The management server 46 for the effective speed information cumulatively stores the communication history information sent from a plurality of the mobile terminals 10. The management server 46 calculates an average value of the effective speed for each area and each communication method at intervals of predetermined time (step S51). Thus, the management server 46 calculates the effective speed for each area by corresponding to a map (step S52), and stores the calculated effective speed as the effective speed information as illustrated in FIG. 2 in the effective speed information DB 59.

The effective speed information DB 59 stores the effective speed information for each area and each communication method for each time for each date, and updates the effective speed information for each area and each communication method for each time for each date based on the effective speed calculated in step S52.

<Process Sequence of Receiving Part of Effective Speed Server>

Figure 15:
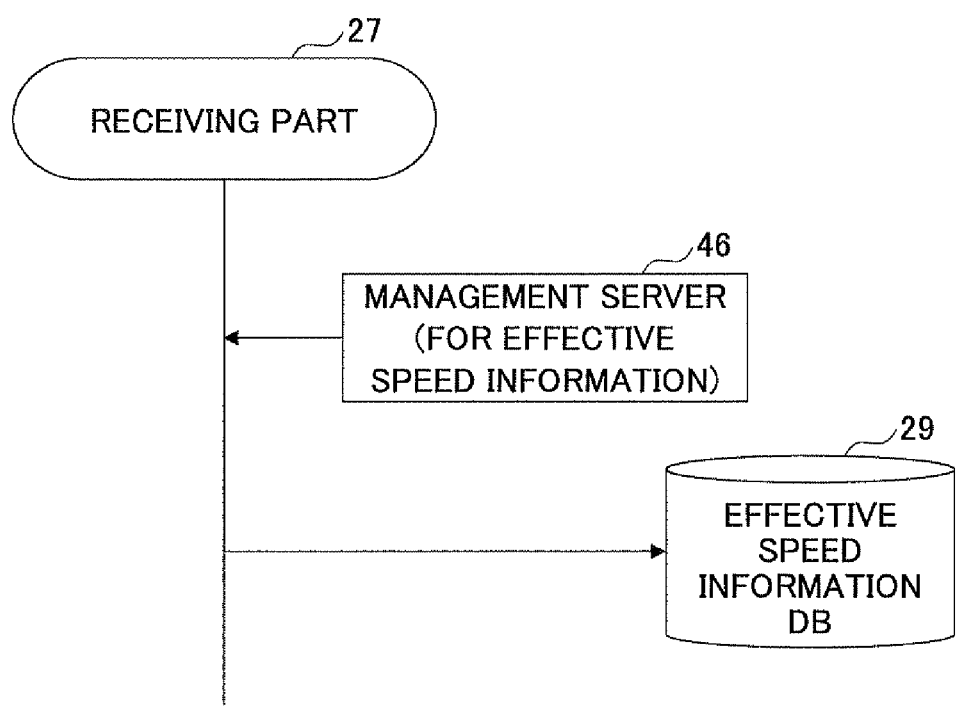
FIG. 15 is a diagram illustrating an example of a sequence of a process executed by a receiving part of an effective speed server.

FIG. 15 is a diagram illustrating an example of a sequence of a process executed by the receiving part 27 of the effective speed server 25. The receiving part 27 of the effective speed server 25 receives the effective speed information (FIG. 2) related to the peripheral area of a location where the mobile terminal 10 exists, and stores the effective speed information to the effective speed information DB 29.

<Modification>

In FIG. 9A and FIG. 9B, the communication execution is planned based on the route information of the train pass. Alternatively, in the planning part 20 for the communication execution, the communication execution may be planned based on an estimated moving direction and an estimated moving speed which are supplied from the moving projection part 36.

The moving projection part 36 estimates the moving direction and the moving speed from the current location of the mobile terminal 10 itself based on passed location information stored in the management part 35 for the movement history. The estimated moving direction and the estimated moving speed are supplied to the planning part 20 for the communication execution. The planning part 20 makes a plan for the communication execution during moving based on the estimated moving direction, the estimated moving speed, the area information for each communication method, the out-of-service information of the radio waves for each communication method, and the effective speed information, and stores information of the plan in the communication plan DB 12. In a case of applying this variation, the communication execution process may be performed as illustrated in FIG. 11.

According to the embodiment described above, it is possible to overcome the following problems of a mobile communication system in the related art. In the related art, in a case in which a mobile terminal performs mobile communication by an arbitrary one of three communication methods for the regular, high speed, and wireless LAN communications, when the mobile terminal enters outside of the accessible region and communication is disconnected, re-connection is attempted by one of two other communication methods. However, it is not aware of when each of three communication methods becomes inside of a service region (available) and when each of three communication methods becomes outside of the service region (unavailable). After the communication is disconnected, the radio waves are searched for by the two other communication methods. The communication is conducted by a communication method for which the radio waves are detected. During the communication, the communication method is not switched to another method.

Accordingly, it takes time to re-connect, and power is consumed to search for the radio waves available for one of the communication methods. Even if the radio waves for a further high speed communication method are found during the communication, the communication method is not switched. Thus, a chance of high speed communication may be lost.

Moreover, when the train enters a tunnel and the mobile terminal in the communication is outside of the communication range, the mobile terminal successively searches for the radio waves for the three communication methods until the communication becomes available. Thus, power of the mobile terminal is consumed. In addition, at a server side of a communication partner, it takes time to detect a communication disconnection due to a timeout.

According to the embodiment, it is possible to provide a mobile communication system which realizes a re-connection in shorter time when the mobile terminal is outside of the accessible region.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile communication system, comprising:
an area information management server; and
a mobile terminal,
wherein
the area information management server is configured to send area information indicating a communicable peripheral area of a location where the mobile terminal exists, and out-of-service information indicating outside of an accessible region, to the mobile terminal; and
the mobile terminal includes
a generating part configured to generate a moving route and moving projection information of the mobile terminal;
a planning part configured to make a plan for communication execution indicating a communication term in which the mobile terminal communicates with a base station and an interruption term which includes a term when the mobile terminal is outside of the accessible region, based on the moving projection information, and the area information and the out-of-service information which are received from the area information management server;
a suspension indicating part configured to indicate suspending or restarting the communication of the mobile terminal itself and a communication partner before and after the interruption term indicated by the plan for the communication execution; and
a communication part configured to communicate with the base station in accordance with the plan for the communication execution.

2. The mobile communication system as claimed in claim 1, further comprising:
a management server configured to send effective speed information indicating an actual communication speed for each of multiple communication methods in the peripheral area of the location where the mobile terminal exists, to the mobile terminal through the base station,
wherein
the area information management server sends the area information and the out-of-service information for each of the multiple communication methods; and
the planning part makes the plan for the communication execution indicating the communication method and the communication term for the mobile terminal to communicate with the base station, and the interruption term for the mobile terminal to interrupt the communication, based on the moving projection information, the area information and the out-of-service information for each of the multiple communication methods, and the effective speed information for each of the multiple communication methods.

3. The mobile communication system as claimed in claim 2, wherein the mobile terminal further includes a sending part configured to send a communication history including time, a location, and an effective speed of the communication which the mobile terminal executed; and the management server updates the effective speed information for each of the multiple communication methods based on the communication history received from the mobile terminal.

4. The mobile communication system as claimed in claim 3, wherein the mobile terminal includes an acquisition part configured to acquire location information of the location where the mobile terminal exists, and when there is a difference between the location information and the moving projection information, the generating part re-generates the moving projection information, and remakes the plan for the communication execution by using the moving projection information.

5. A mobile terminal, comprising:

a generating part configured to generate a moving route of the mobile terminal and moving projection information;

a planning part configured to make a plan for a communication execution indicating a communication term and an interruption term based on the moving projection information and area information and out-of-service information which are received from an area information management server, the communication term being a term in which the mobile terminal communicates with a base station, the interruption term including a term when the mobile terminal is outside of an accessible region and in which a communication is interrupted, which area information indicates a communicable peripheral area of a location where the mobile terminal exists, and which out-of-service information indicates a location being outside of the accessible region;

a suspension indicating part configured to indicate suspending or restarting the communication of the mobile terminal itself and a communication partner before and after the interruption term indicated by the plan for the communication execution; and a communication part configured to communicate with the base station in accordance with the plan for the communication execution.

6. The mobile terminal as claimed in claim 5, wherein the planning part makes the plan for the communication execution which indicates a communication method and the communication term in which the mobile terminal communicates with the base station and the interruption term in which the communication is interrupted, based on the moving projection information, the area information for each of multiple communication methods and the out-of-service information which are received from the area information management server, and effective speed information received from a management server which manages the effective speed information, which area information for each of multiple communication methods indicates the communicable peripheral area of the location where the mobile terminal exists, which out-of-service information indicates the location being outside of the accessible region.

7. The mobile terminal as claimed in claim 6, further comprising a sending part configured to send a communication history including information of time, a location, and an effective speed of the communication conducted by the mobile terminal.

8. The mobile terminal as claimed in claim 7, further comprising an acquisition part configured to acquire location information of the location where the mobile terminal exists, wherein when there is a difference between the location information and the moving projection information;

the generating part re-generates the moving projection information; and the planning part remakes the plan for the communication execution by using the moving projection information.

9. The mobile communication system as claimed in claim 4, wherein the mobile terminal includes a detection part configured to detect a residual capacity of a battery of the mobile terminal, and the planning part makes the plan for the communication execution by selecting the communication method depending on the residual capacity of the battery.

10. The mobile communication system as claimed in claim 9, wherein the planning part makes the plan for the communication execution by selecting the communication method being less than or equal to a communication speed for the mobile terminal.

* * * * *